United States Patent Office 3,316,297
Patented Apr. 25, 1967

3,316,297
PREPARATION OF UREAS BY MANGANESE-CATALYZED CARBONYLATION OF AMINES
Fausto Calderazzo, Geneva, Switzerland, assignor to American Cyanamid Company, Stamford, Conn., a corporation of Maine
No Drawing. Filed Dec. 20, 1965, Ser. No. 515,239
10 Claims. (Cl. 260—553)

This invention relates to an improved process of preparing symmetrical, 1,3 di-substituted ureas of the formula

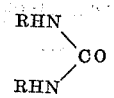

in which R is a hydrocarbon radical free from double bonds.

Symmetrical di-substituted ureas are known as useful intermediates in organic syntheses, metal complexing agents, paper plasticizers, and the like. The processes for preparing the di-substituted ureas have been complex or have required large amounts of reagents, such as for example sulfur and carbonyl sulphide. It has also been proposed to prepare the ureas from amines and carbon monoxide in the presence of relatively large amounts of nickelous iodide, for example molar ratios to the amine of the order of 0.064.

The present invention utilizes a one-step reaction of carbon monoxide and the primary amine in the presence of small catalytic amounts, molar ratios to amine of 0.023 to 0.0087, of manganese decacarbonyl or alkyl manganese pentacarbonyl. The reaction proceeds with satisfactory yield by heating at temperatures above about 120° C. and preferably in the approximate range of 180° to 200° C. The reaction can take place with the primary amine as a reaction medium or in the presence of inert solvents, such as for example alkanes and tetrahydrofuran. The carbon monoxide is under pressure, preferably of the order of 100 to 135 atmospheres with satisfactory stirring, as is commonly used in reactions with gases and liquids under pressure.

The reaction of the present invention requires, first, that the reaction take place in the coordination sphere of the manganese and, secondly, that the amines be primary amines free from double bonds. Secondary and tertiary amines or aromatic amines, such as aniline, react very slowly and produce little or no di-substituted ureas, as is also the case with ammonia. The reaction is not a general one with manganese catalysts but only with the manganese carbonyls set out above. It is not known why the successful production of di-substituted ureas is so critically dependent on a particular kind of manganese catalyst and why the amines must be primary amines which do not contain double bonds, i.e., alkyl amines or alicyclic amines. It is not intended to limit the present invention to any particular theory of reaction mechanism.

It is an advantage of the present invention not only that the reaction proceeds smoothly but that substantially the only product is the di-substituted urea. Negligible amounts, 3% or less, of N-alkyl formamides are produced. It is thus possible not only to produce the symmetrical di-substituted ureas effectively and in satisfactory yield by a simple process, but it is also possible to use as reagents mixtures of amines, for example mixtures which contain primary amines contaminated with secondary or tertiary amines. The invention will be described in greater detail in conjunction with the following specific examples in which the parts are by weight unless otherwise specified.

EXAMPLE 1

132 grams, (153 ml. or 1.33 moles), of cyclohexyl amine and 100 ml. of heptane were placed in an autoclave with 2.26 grams of manganese decacarbonyl, $$(Mn_2(CO)_{10})$$

and carbon monoxide introduced and compressed to 130 atmospheres. Content of the autoclave was stirred and heated to 180°–200° C. for approximately 12 hours. After cooling, no significant gas absorption was observed, but hydrogen was present in the gas phase. Colorless crystalline 1,3 dicyclohexylurea was suspended in the reaction medium, collected under nitroegn, filtered, washed with heptane, and dried in a vacuum. The yield, based on the amine, was somewhat over 40%. The dicyclohexylurea was recrystallized from ethyl alcohol, which did not greatly increase the purity.

EXAMPLE 2

The procedure of Example 1 was repeated without the heptane, the cyclohexylamine constituting the reaction medium. The yield increased somewhat to 52%.

EXAMPLE 3

The procedure of Example 1 was repeated, using as a catalyst $CH_3Mn(CO)_5$. The amounts were somewhat lower and so was the yield, approximately 25%.

EXAMPLE 4

The procedure of Example 1 was repeated, substituting tetrahydrofuran for the heptane. Yields were approximately 58%.

EXAMPLE 5

57.9 grams of n-butylamine were charged into an autoclave with 170 ml. of heptane and 2.26 grams of manganese decacarbonyl. Carbon monoxide at 131 atmospheres was introduced, the autoclave stirred and heated at 180°–200° C. for approximately 12 hours. The reaction mixture was cooled and treated as described in Example 1. An approximately 47% yield of 1,3 di-n-butyl urea was produced and was purified by recrystallization from heptane.

EXAMPLE 6

Example 5 was repeated without the heptane, and yields of 52% were obtained.

EXAMPLE 7

Example 5 was repeated, but the temperature was dropped to 120°–130° C. and the time lengthened to 35 hours. The yield dropped to 15% and represents approximately the lowest operating temperature that can be practically used.

EXAMPLE 8

The procedure of Example 5 was repeated, replacing the heptane with tetrahydrofurane and using methyl manganese pentacarbonyl in the amount used in Example 3. The yield was 33%.

When the procedure of Example 2 was repeated, replacing the manganese decacarbonyl with the same concentration of manganese di-acetate, no di-substituted urea was obtained. Also, when aniline was used in the process described in Example 8, no di-substituted urea was produced, but by using manganese decacarbonyl in a heptane medium, as described in Example 1, a small amount, 6%, of diphenyl urea was produced, but only after 48 hours of heating.

Ammonia produced no di-substituted urea, or less than 3% when used with manganese decacarbonyl or with methyl manganese pentacarbonyl.

I claim:
1. A process of producing symmetrical di-substituted ureas having the formula

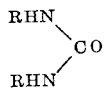

which R is a hydrocarbon radical free from double bonds which comprises heating the corresponding primary amine selected from the group consisting of alkyl and alicyclic amines with carbon monoxide under pressure at temperatures in excess of 120° C., with a catalytic amount of a compound selected from the group consisting of manganese decacarbonyl and alkylmanganese pentacarbonyl and recovering the di-substituted urea from the reaction mixture.

2. A process according to claim 1 in which the temperature is 180°–200° C. and the pressure is from 100 to 135 atmospheres.

3. A process according to claim 2 in which R is cyclohexyl.

4. A process according to claim 3 in which the catalyst is manganese decacarbonyl.

5. A process according to claim 3 in which the catalyst is methylmanganese pentacarbonyl.

6. A process according to claim 3 in which the reaction is in an inert solvent.

7. A process according to claim 2 in which R is n-butyl.

8. A process according to claim 7 in which the catalyst is manganese decacarbonyl.

9. A process according to claim 7 in which the catalyst is methylmanganese pentacarbonyl.

10. A process according to claim 7 in which the reaction is carried out in an inert solvent.

No references cited.

ALEX MAZEL, *Primary Examiner.*

HENRY R. JILES, *Examiner.*